United States Patent [19]

Holzer et al.

[11] Patent Number: 4,964,729
[45] Date of Patent: Oct. 23, 1990

[54] EXTRUDING DEVICE

[75] Inventors: Heinrich Holzer, Niederglatt, Switzerland; Hans-Dieter Wagner, Eggingen, Fed. Rep. of Germany

[73] Assignee: RCM Rubber Consulting & Machinery, Hori, Switzerland

[21] Appl. No.: 364,800

[22] Filed: Jun. 9, 1989

[30] Foreign Application Priority Data

Jun. 10, 1988 [CH] Switzerland ................ 2224/88

[51] Int. Cl.$^5$ .............................. B01F 7/08; B29B 1/06
[52] U.S. Cl. ........................................ 366/75; 366/79; 366/82; 366/90; 425/208
[58] Field of Search ................ 366/75, 79, 90, 80–82, 366/83, 87, 318, 303, 305–307; 425/208, 209

[56] References Cited

U.S. PATENT DOCUMENTS

| | | | |
|---|---|---|---|
| 3,870,285 | 3/1975 | Bausch et al. | 366/82 |
| 4,260,264 | 4/1981 | Maki et al. | 366/76 |
| 4,423,960 | 1/1984 | Anders | 366/88 |
| 4,679,498 | 7/1987 | Chaueron et al. | 366/75 |
| 4,723,901 | 2/1988 | Sarumaru | 425/208 |

FOREIGN PATENT DOCUMENTS 2110946 6/1983 United Kingdom ................ 366/82

*Primary Examiner*—Timothy F. Simone

[57] ABSTRACT

The mass which is made flowable (rendered plastic) must be degassed on its way to the outlet. In order to make the degassing section free of pressure a diaphragm, through which the mass flows, is provided further upstream. The extruding helix is provided with at least one helical flute, the free flow passage of which is blocked, and the diaphragm is provided with an adjustable throughput area. The diaphragm can simply consist of two perforated disks, which are rotatable with respect to each other around their axes. Each perforated disk has a fixed throughput area. The holes of both perforated disks overlap more or less, or not at all. The throughput rate of the mass through the extruding device can therefore, according to the state or the kind of mass, be regulated independently of the rotation speed of the extruding helix. Different masses can be extruded with one and the same helix, in a way hitherto not possible. One can also use an extruding helix which is shorter than was hitherto possible. The perforated disks can be easily exchanged.

10 Claims, 2 Drawing Sheets

EXTRUDING DEVICE

BACKGROUND OF THE INVENTION

The invention relates to an extruding device with an extruding helix for urging a flowable mass towards an outlet, a diaphragm through which the flowable mass flows being provided alongside the helix, and there being provided a degassing section downstream of the diaphragm.

In a first section of the extruding helix (as seen in its direction of travel) a mass is rendered plastic, i.e. flowable, by heating. During this passage into the plastic state gases are formed (water vapor and other gases) which are then evacuated from the device into a degassing section. A diaphragm is provided upstram of the degassing section, so that the latter is situated in a zone with no pressure.

DESCRIPTION OF THE PRIOR ART

In a known device there is provided at least one helical flute, the free flow passage of which is blocked off by a transverse wall, and this wall is provided with numerous overflow grooves. Said mass, which has been made flowable (rendered plastic), in the first section of the helix must pass through these numerous grooves, each of which has a very small transverse area, which strongly restricts the flow of the mass. The flowable mass is hereby divided into a large number of small strands, which collectively exhibit a large surface, so that an efficacious degassing takes place in the pressure-free degassing section which follows. A drawback of this known extruding device is that the transfer rate of the device (amount of mass flowing through the time unit) can only be varied through the rotation speed of the extruding helix, unless one uses another helix with a different pitch. Because the mass to be moved, e.g. rubber, is a bad heat conductor, the heat transfer necessary to make the mass plastic in said first section of the helix must be obtained through convection. This entails that the mass to be rendered plastic must be moved as much as possible along a wall which can be heated (helix and casing) so that it may carry the necessary heat along. However, the transfer of heat through convection requires that a certain minimal rotation speed of the helix be exceeded. Therefore, in order to obtain a sufficient plastification in this first section of the helix, the rotation speed of the helix cannot be reduced at will, and so the transfer speed also cannot be arbitrarily reduced. Even if the rotation speed of the helix is chosen just low enough to obtain a sufficient plastification in said first section of the helix, the known device is not satisfactory whenever an extrusion with a small transfer rate (amount at the outlet) is needed because then a back pressure can build up as far as the degassing section. The latter then is not free of pressure anymore, so that no degassing is possible without an exiting of plastified mass. If this is to be absolutely avoided with the known devices, then the helix in the interval between the outlet and the degassing section must be very long. Both the use of several different helixes and a great helix length are undesirable.

It is aimed at obtaining an extruding device which avoids the stated drawbacks.

SUMMARY OF THE INVENTION

The extruding device according to the invention is characterized in that the free throughput of the diaphragm is adjustable.

Another object of the invention is that this throughput area of the diaphragm can be varied continuously.

BRIEF DESCRIPTION OF THE DRAWINGS

The invention will be better understood and objects other than those set forth above will become apparent when consideration is given to the following detailed description thereof. Such description makes reference to the annexed drawings, wherein.

DESCRIPTION OF THE PREFERRED EMBODIMENT

Figure 1:
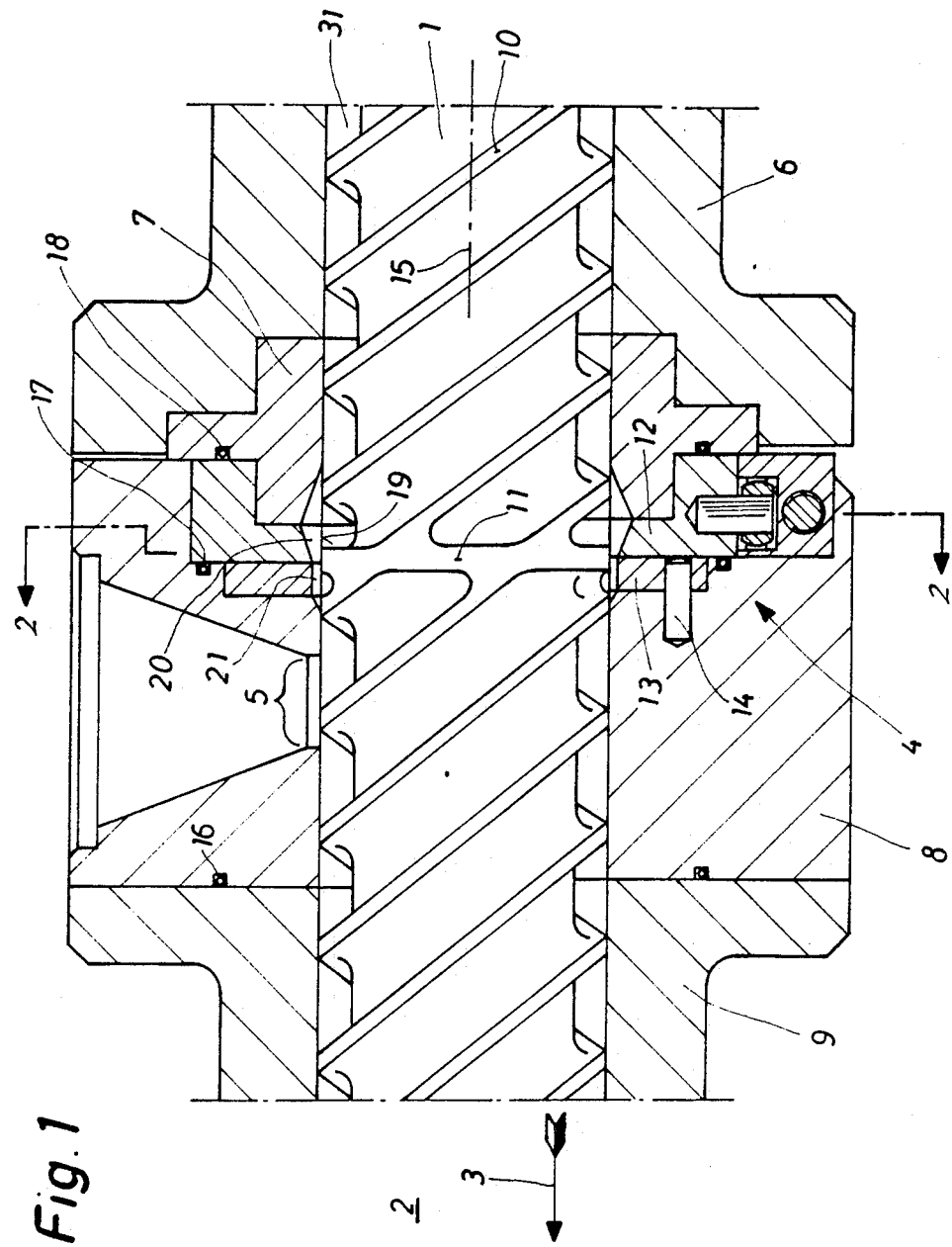
FIG. 1 shows a lengthwise section through a part of the extruding device.

The extruding device has an extruding helix 1 for moving a flowable mass (not shown in the drawing) towards an outlet 2, which is also not shown in the drawing but which would lie on the left-hand side of it. The mass is thus moved in the direction of the arrow 3. Alongside the helix 1 there is a diaphragm 4, through which the flowable mass flows. Downstream of the diaphragm 4 there is a degassing section 5. The helix 1 rotates in a casing which comprises the parts 6-9. The helix 1 has one or several threads, i.e. it has at least one thread 10 for urging the mass forward. The throughput area of a helical flute is determined by the distance between the neighboring surfaces of two threads, and by the difference between the kernel radius of the helix and the inner radius of the casing which surrounds it. As shown in FIG. 1, a transverse wall 11 blocks off the throughput area of the helical flute. This also stops the urging of the flowable mass by the helix. At this point the flow of the flowable mass occurs solely through the diaphragm 4, which consists of two perforated disks 12 and 13, which are movable with respect to each other within their planes. The perforated disk 13 is kept fixed with respect to the casing by means of a plug 14, while the other perforated disk 12 is rotatable around its axis, which coincides with the rotation axis 15. The two perforated disks 12, 13 are in intimate and mutual contact with one of their surfaces. Both perforated disks 12, 13 are positioned between the two casing elements 7, 8. The sealing of surfaces which face each other is achieved through 0-rings 16, 17, 18. The two perforated disks 12, 13 are affixed to the casing elements 7 and 8 in a removable way.

Figure 2:
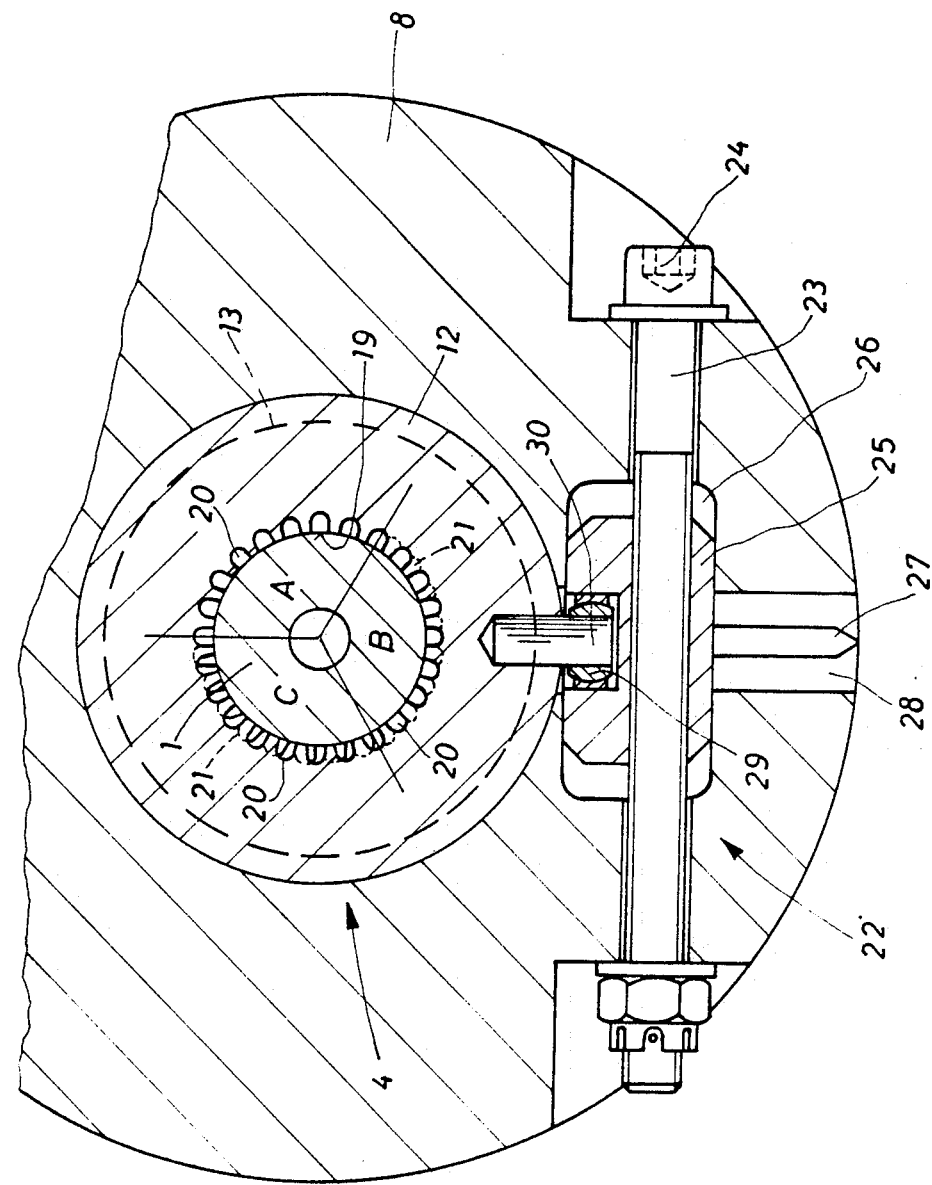
FIG. 2 shows a section along II—II in FIG. 1, where a perforated disk which is movable with respect to the casing is shown in three different positions relative to a perforated disk which does not move with respect to the casing.

Both perforated disks 12, 13 are shaped as flat rings and their inner surfaces have the same diameter which corresponds to the inner diameter of the casing elements 6-9. The throughput area of both perforated disks 12, 13 are formed as radial grooves 20 and 21 provided on the inner surface 19. As can be seen in FIG. 1, the radial grooves 20 of the perforated disk 12 widen progressively in a conical shape towards the casing element 7; this conical widening is not shown in the section of FIG. 2. The casing element 7 has a similar conical widening of its inner surface, in order that the flowable mass need not take sharp turns when entering the diaphragm 4. As can further be seen in FIG. 1, the radial grooves 21 of the perforated disk 13 have a depth which extends parallel to the rotation axis 15. In line with these grooves, the part of the casing element 8 which lies in their prolongation exhibits a small conical widening of its inner surface, again so that the flowable mass can enter the throughput area of the helical flute without negotiating a sharp corner. At the frontal surfaces which face each other, both perforated disks 12, 13 have the same throughput area. Further, the throughput area of each perforated disk 12, 13 is fixed. However, if the perforated disk 12 is rotated around the rotation axis 15 with respect to the perforated disk 13, then their throughput areas overlap more or less, or not at all. Three different positions of both perforated disks 12, 13 with respect to each other are shown schematically in FIG. 2. Within the sector A the radial grooves 20, 21 of the perforated disks 12, 13, i.e. the throughput areas of both perforated disks are in line with each other, so that the diaphragm 4 has a maximal throughput area. Hence this throughput area consists of the transversal sections of all grooves 20. In sector B the grooves 20 lie in the intervals between the grooves 20, so that the entire throughput area of the perforated disk 12 is blocked by the perforated disk 13. This then means that the throughput areas of both perforated disks 12, 13 do not overlap in any way. That is, the flowable mass does not flow at all. The diaphragm 4 thus has become a closure. In the sector C about half the grooves 20 are covered by the perforated disk 13, which lies behind it, so that about only half of the throughput areas of all grooves 20 are available for the flowing mass. In this case the diaphragm 4 is approximately adjusted at an intermediate setting between "fully closed" and "fully open". Thus the throughput area of the diaphragm 4 can be variably adjusted between these two extreme positions. When the perforated disk 12 is continuously rotated around the rotation axis 15, with respect to the perforated disk 13, then the throughput area of the diaphragm 4 is also varied continuously. This turning of the perforated disk 12 can be performed in various ways. The represented embodiment shows only one among many possibilities. There is provided an adjusting device 22, which protrudes outside the casing unit 8. This adjusting device comprises a rotatable threaded bolt 23, which can be rotated continuously by means of an adjusting means 24. A nut 25 rides on the threaded bolt 23, and can slide in a groove 26 of the casing unit 8. The nut 25 carries a pointer 27, which shows the shift of the nut 25 on an adequate scale (not shown in the drawing). Thus the pointer shows the amount of overlap between the grooves 20, 21, and hence the adjusted throughput area of the diaphragm 4. That is, the pointer 27 also lies in a recess 28 of the housing unit 8. Within the nut 25 there is provided a self-aligning bearing 29, in which a pin 30 is slidably mounted. The other end of this pin 30 is engaged in a recess of the perforated disk 12. When the threaded bolt 23 is rotated, the perforated disk 12 is rotated continuously in one or the other direction, so that the throughput area of the diaphragm 4 can be adjusted continuously.

The described extruding device works as follows. If a certain amount of flowable mass must be available per time unit at the outlet 2, then the throughput area of the diaphragm 4 and the rotation speed of the helix 1 are determined so that an optimal plastification of the mass takes place in said first section of the helix 1. If a correction is necessary, the rotation speed of the helix 1 can be increased and the throughput area of the diaphragm be reduced. With the device of the invention, the extruding helix 1 can be comparatively short, because there is a simple way to avoid a back-pressure which propagates from the outlet 2 back to the degassing section 5, namely by correspondingly reducing the throughput area of the diaphragm 4. A further advantage of the extruding device results from the effect, that both perforated disks can be easily exchanged. Thus the elements which form the diaphragm are subject to an accelerated wear, so that, in contradistinction to previously known devices, there is no need to exchange the entire helix. The described extruding device can be advantageously adjusted. It is e.g. possible to measure the pressure of the plastified mass at the outlet 2. Further, one can measure the temperature of the mass during plastification, i.e. approximately in section 31 of the extruding helix. Further, one can measure the pressure at the outlet 2. Therefore, one can, for instance, regulate the temperature of the mass during plastification, because this temperature is a criterion for an optimal plastification. Thus, the regulation section lies between the plastification section 31 and the outlet 2. The regulating parameter would then be the temperature of the mass in section 31. This temperature of the mass in the section 31 can be measured with a sensor. The adjusting means can either be the threaded bolt 23 or a device which modifies the rotation speed of the helix 1. The regulating parameter would then be the angular position of the perforated disk 12, or the rotational speed of the helix, respectively. A disturbance could thus be a change of temperature of the mass in the plastification section 31, and an increase in pressure in the degassing section 5, or at the outlet 2.

While there is shown and described a preferred embodiment of the invention, it is to be distinctly understood that the invention is not limited thereto, but may be otherwise variously embodied and practiced within the scope of the following claims.

We claim:

1. Extruding device comprising a casing, a passage through the casing for a flowable mass, the passage having an outlet, and an extruding helix in the passage for urging the flowable mass in the passage towards the passage outlet, a restraining diaphragm placed alongside the helix in the passage, the diaphragm having an adjustable size throughput area through which the flowable mass flows, means for selectively adjusting the size of the throughput area for controlling the flow of the flowable mass, and a degassing section downstream of the diaphragm.

2. Device according to claim 1, wherein the throughput area of the diaphragm is continuously adjustable by the adjusting means.

3. Device according to claim 1, wherein the adjustable diaphragm comprises two perforated disks positioned facewise next to the other in the flow path of the flowable mass, the disks being mutually movable with respect to each other within their respective planes, each disk having a respective fixed throughput area which is shaped and placed such that when the two perforated disks are moved with respect to each other, their throughput areas overlap selectively more or less, or not at all.

4. Device according to claim 3, wherein the respective throughput area of each perforated disk is provided by groove-shaped radial depressions defined in the inner surface of the perforated disk around the helix and the disks having the general shape of flat rings.

5. Device according to claim 3, further comprising first means mounting one of the perforated disks rigidly in the casing which encloses the helix, and second means mounting the other perforated disk for adjustment by the adjusting means rotatably around its axis.

6. Device according to claim 5, further comprising an adjusting element for rotating the other perforated disk, the adjusting element being shaped to protrude outside the casing.

7. Device according to claim 3, wherein the mounting means mounting both perforated disks are mounted in the casing which encloses the extruding helix.

8. Device according to claim 1, wherein the helix comprises at least one conveyor ramp in the passage, and in the neighborhood of the diaphragm, the helix having a transverse separating wall which blocks off the free flow passage in the flute of the helix.

9. Device according to claim 1, wherein the flowable mass is rubber and the extruding device is for extruding rubber.

10. Device according to claim 9, wherein there is only a single extruding helix for moving the flowable mass through the passage.

* * * * *